UNITED STATES PATENT OFFICE.

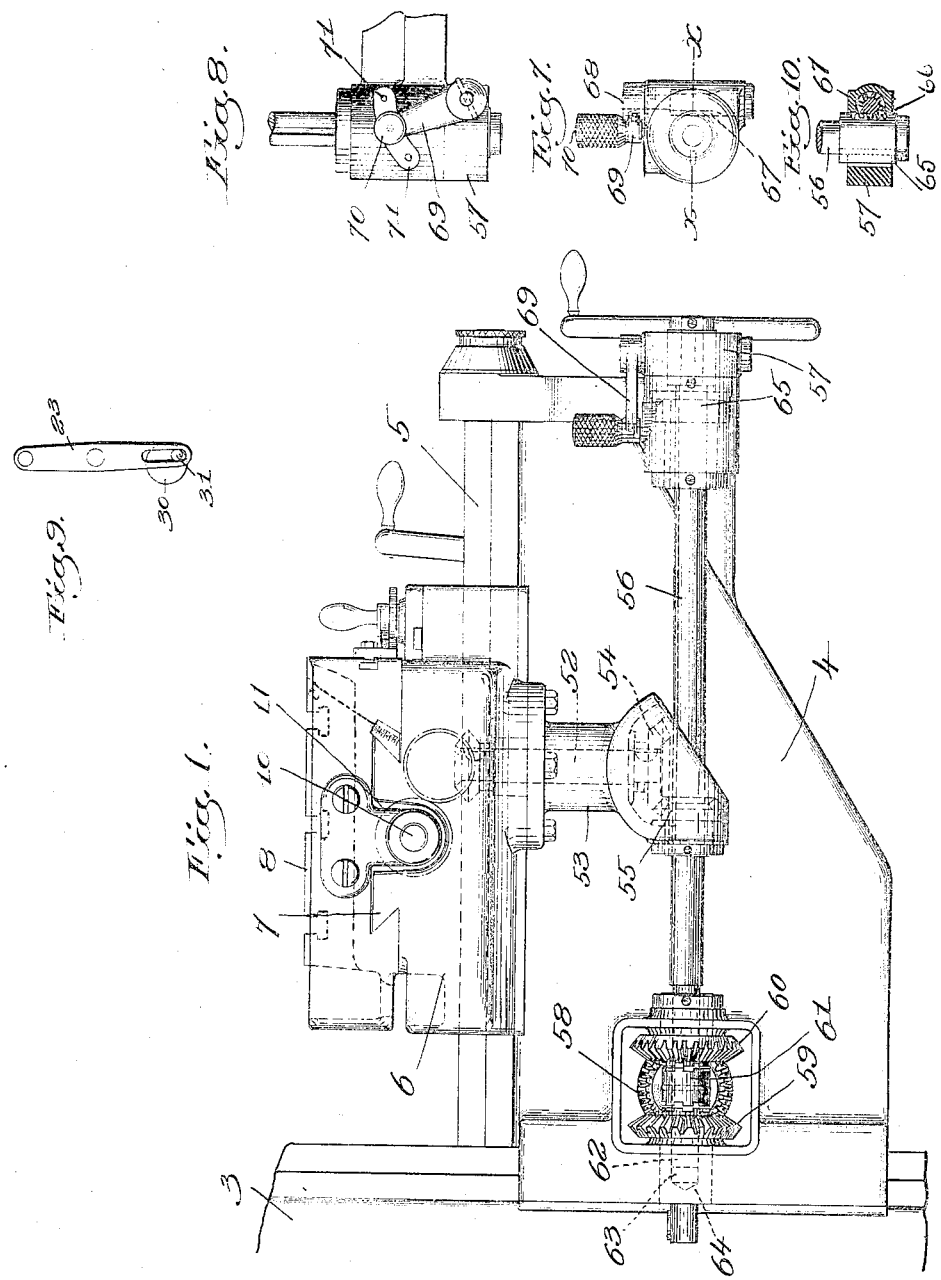

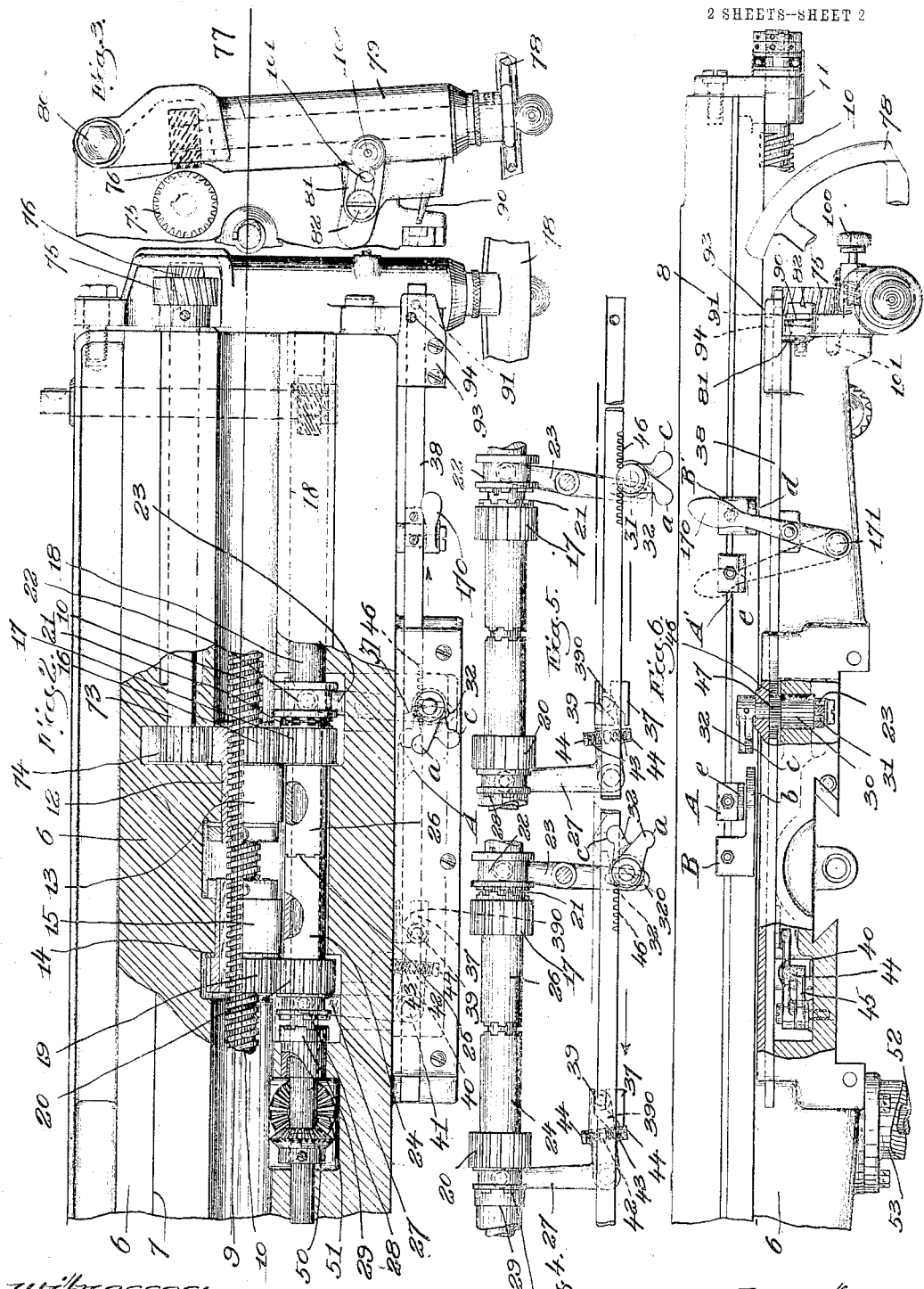

JOHN EDGAR, OF HYDE PARK, MASSACHUSETTS, ASSIGNOR, BY MESNE ASSIGNMENTS, TO THE CINCINNATI MILLING MACHINE COMPANY, OF CINCINNATI, OHIO, A CORPORATION OF OHIO.

FEED MECHANISM FOR MILLING-MACHINES, LATHES, &c.

1,131,496.     Specification of Letters Patent.     Patented Mar. 9, 1915.

Application filed December 21, 1907, Serial No. 407,579. Renewed May 15, 1914. Serial No. 838,893.

*To all whom it may concern:*

Be it known that I, JOHN EDGAR, a subject of the King of Great Britain, and a resident of Hyde Park, in the county of Norfolk and State of Massachusetts, have invented an Improvement in Feed Mechanism for Milling-Machines, Lathes, &c., of which the following description, in connection with the accompanying drawing, is a specification, like letters on the drawing representing like parts.

This invention has relation to feed mechanism for milling machines and lathes, and it has for its object to provide a novel feed mechanism in which the principle of a differential screw and nut mechanism is used.

The feed mechanism is so arranged that the differential screw and nut mechanism may be thrown into operation to feed the table forward with a slow movement, or may be converted into a direct acting mechanism for returning the table with a comparatively quick movement.

The feed mechanism is also reversible so that the slow feeding movement may be given to the table in either direction.

I will first describe one embodiment of my invention and then point out the novel features thereof in the appended claims.

In the drawings I have shown the invention as embodied in a milling machine but I wish it understood that said invention is not necessarily limited in its application to milling machines.

Figure 1 in the drawings shows a side view of the knee of a milling machine having my improvements applied thereto; Fig. 2 is a plan view of the carriage with the table removed, a part of said carriage being broken out to better show the construction of the differential screw mechanism; Fig. 3 is a partial end view of Fig. 2; Figs. 4 and 5 are detail views showing the clutch mechanism for the differential screw mechanism shifted into different positions; Fig. 6 is a front view of the carriage with the table thereon, a part of the carriage being broken out to better show the construction; Fig. 7 is an end view of the bearing for the driving shaft; Fig. 8 is a top plan view of Fig. 7; Fig. 9 is a detail of the lower end of the lever 23 showing the means for operating it; Fig. 10 is a section on the line $x$—$x$, Fig. 7.

A portion of the frame of the milling machine is shown at 3 and the knee of the milling machine at 4. This knee is provided with the usual ways 5 on which a carriage 6 is mounted for movement toward and from the frame 3, and the carriage has the usual ways 7 thereon on which is mounted the usual table 8 to which the work to be milled is clamped in some suitable way. These parts are such as are usually found in milling machines and constitute no part of my invention which relates to the mechanism to be described for feeding the table 8 on the carriage 6.

The carriage is made with the longitudinally-extending groove or recess 9 in which is located a feed screw 10 that is carried by the table 8, the ends of the feed screw being journaled in suitable bearings 11 rigid with the table. The feed screw is arranged to be rotated in these bearings but is held from movement longitudinally of the table. The feed screw forms part of a differential screw and nut mechanism by which the table is given its feeding movement. As herein shown this differential screw and nut mechanism includes a nut 12 which has screw-threaded engagement with the feed screw 10 and which is rotatably mounted in a bearing or hub 13 formed either integral with or rigid with the carriage 6, and said differential screw and nut mechanism also includes a sleeve 14 which is splined to the screw 10 and which is rotatably mounted in a bearing 15 carried by the carriage. The nut 12 and sleeve 14 are held from movement longitudinally of the carriage but are capable of rotating in their bearings.

The nut 12 has rigid therewith a gear wheel 16 which meshes with a pinion 17 loosely mounted on a driving shaft 18 which is journaled in suitable bearings in the carriage. The sleeve 14 has rigid therewith a pinion 19 which meshes with a pinion 20 which is also loosely mounted on the driving shaft 18. Either the gear 16 or pinion 17 has a different number of teeth from the gear 19 or the pinion 20, and as illustrated in the drawings the gear 16 has one more tooth than the gear 19 in order to provide for securing the quick movement of the table in a direction opposite to that of the slow movement as will be more fully hereinafter explained. The pinion 17 is provided with clutch teeth 21 which are adapted to engage coöperating clutch teeth formed on a driving clutch member 22 which is splined to the shaft 18, and which may be moved longitudinally thereof by a clutch-operating lever 23 which is pivoted to the carriage. By operating the lever 23, therefore, the pinion 17 may be clutched to the driving shaft 18 or unclutched therefrom as desired. Means are also provided for either clutching the pinion 20 to the driving shaft 18 or holding said pinion stationary according as it is desired to have the screw and nut operate differentially or to have them operate direct.

If both the pinions 17 and 20 are clutched to the driving shaft the nut 12 and sleeve 14 will be rotated in the same direction but at different speeds owing to the fact that the gear 16 has a different number of teeth from the gear 19, and as the sleeve 14 is splined to the feed screw 10 the result will be that said feed screw and nut will rotate at different speeds whereby said table will have a slow feeding movement due to the differential movement between the screw and nut. If on the other hand the pinion 20 and consequently the feed screw 10 is locked against rotary movement and the pinion 17 remains clutched to the driving shaft then the table will be given a movement on the carriage due to the direct operation of the nut 12 alone.

With the construction shown wherein the gear 16 has a greater number of teeth than the gear 19 the slow feeding movement of the table due to the operation of the differential mechanism will be in one direction while the quick movement of the table due to the direct action of the nut 12 alone will be in the opposite direction. This is so because when the differential mechanism is in operation the screw rotates in the same direction as, but faster than, the nut 12 and therefore the screw feeds through the nut; while when the mechanism is acting direct the screw is stationary and nut 12 rotates, and the effect is the same as if the nut rotated faster than the screw.

It is not essential to my invention that the nut be driven by the gear 17 and the sleeve be operated by the gear 20 as the same result could be secured by a reversal of the parts in which the sleeve is operated by the gear 17 and the nut by the gear 20.

For clutching the pinion 20 to the shaft I have provided said pinion with a sleeve 24 which has clutch teeth 25 on its end that are adapted to have engagement with similar clutch teeth on a sleeve 26 which is rigid with the pinion 17. The pinion 20 with its sleeve 24 is adapted to be moved longitudinally of the shaft to disconnect the sleeves 24, 26, or connect them together by means of a lever 27 which is pivoted to the carriage. For holding the pinion 20 stationary when the mechanism is operating direct said pinion is provided with clutch teeth 28 which are adapted to engage similar clutch teeth in a stationary sleeve 29 which is supported by the carriage and through which the shaft 18 extends. With this construction the sliding of the pinion 20 longitudinally of the shaft 18 will disconnect said pinion from the pinion 17 and at the same time will clutch it to the stationary clutch member 29 thus locking the said pinion and the feed screw from rotary movement. The gears 19 and 20 are sufficiently wide so that they are not thrown out of mesh with each other by this longitudinal movement of the pinion.

In operating a milling machine it is desirable to have the table come to rest automatically at the end of the feeding stroke and to remain at rest until its direction is reversed by the operator. In the present embodiment of my invention the operation of the feeding mechanism may be stopped by shifting the clutch-operating lever 23 to disengage the driving clutch 22 from the pinion 17 and the direction of rotation may be reversed by bringing said clutch 22 back into engagement with the pinion 17 and at the same time shifting the pinion 20 to lock it to the stationary clutch member 29. In order to secure this automatic stopping of the feed mechanism at the end of the feeding stroke, and also to provide for converting the mechanism at the will of the operator into a direct acting one for turning the table with a quick movement I have provided the following mechanism: The lever 23 is actuated by a rotatable actuator or trip member 30 which is journaled in the carriage 6, and which carries at the end an eccentrically arranged pin 31 that plays in a slot 32 formed in the lower end of said lever, see Fig. 9. The actuator 30 has rigid therewith a trip device 32 which is adapted to be engaged by one of a plurality of dogs A and B that are adjustably carried by the table 8. These dogs are provided with cam surfaces and will be so adjusted on the table that at the end of the feeding stroke one of the cams engages the trip device and thereby rocks the actuator 30, such turning or rocking movement of the actuator operating through the pin 31 to shift the lever 23 sufficiently to disengage the clutch 22 from the pinion 17. When the clutch is thus disengaged the further feeding movement of the carriage will cease as will be obvious. As stated above the return movement of the carriage can be secured by again throwing the clutch 22 into engagement with the pinion 17 and at the same time locking the pinion 20 by bringing its clutch teeth into engagement with the stationary clutch member 29. The mechanism for accomplishing this is under the control of the operator and comprises a slide 38 which is connected to and operated by a hand lever 170 pivoted to the carriage at 171, and which slide carries a block 37 having a cam groove 390 therein in which is received a pin 39 extending from an arm 40 which is pivoted to the carriage at 41, and which is yieldingly connected to an arm 45 rigid with the lever 27. The yielding connection between the arms 40 and 45 is provided by two springs 43 which bear against a lug 42 rigid with the arm 40 and which also bear against ears 44 formed on the lever 45, as shown in dotted lines Fig. 2. With this construction the turning of the hand lever 170 toward the left, Figs. 2 and 6, will shift the slide 38 toward the left thereby turning the lever 27 through the operation of the cam block 37 and throwing the pinion 20 on sleeve 24 into engagement with the stationary clutch member 29. The slide 38 is provided with rack teeth 46 which engage teeth 47 formed on the actuator 30 so that the manual movement of the slide operates also to turn the actuator.

The dotted lines in Figs. 2 and 4 show the position of the trip device when the clutch 22 is in engagement with the pinion 17, and the full lines in said figures show the position of the trip after it has been acted on by the dogs to throw the clutch out of engagement. Thus, the normal position of the parts as depicted by Fig. 2 is such as to produce the differential motion which (in the setting of the motion-reverser 61 assumed at this time) causes the table to "feed" to the right as indicated by the short arrow as well as by the slant or side to which the hand-lever 170 is thrown, i. e., its position drawn in full-lines in Fig. 6. The dog shown in dotted lines by Fig. 2 therefore moves slowly to the right and as soon as it impacts contact-surface a of the arm 32 of the trip-member 30, then such trip-member will be turned anti-clockwise and the advance feed will cease and the table will stop. Now, when the hand-lever 170 is thrown toward the left into the position indicated by dotted lines in Fig. 6, then not only will the direction of travel be reversed but its rate will also be increased so that the table will execute a quick-traverse return, and the motion will continue until the dog shown in dotted lines by Fig. 4 impacts the contact-surface c of the trip-member 30 and swings it clock-wise and causes the table again to stop.

When the actuator is turned from the dotted line position Fig. 2 to the dotted line position Fig. 4 by the slide 38 the pin 31 is moved through 180°, and therefore said pin is in a proper position to operate the lever 23 to disengage the clutch 22 when the trip device is in either one of the two dotted line positions shown in Figs. 2 and 4.

While the differential feed mechanism is in operation and the clutch 22 is in engagement with the gear 17, the trip device occupies the dotted line position Fig. 2, and at the end of the stroke said trip device is thrown into the full line position by a dog 33 thereby to disengage the clutch 22, the parts being then in the positions shown in Fig. 2.

To convert the differential mechanism into a direct acting mechanism for returning the table with a quick movement the operator turns the handle 170 about its pivot into the dotted line position Fig. 6, thus moving the slide 38 from the position shown in Fig. 2 to the position corresponding to the dotted line position of the trip in Fig. 4. Such movement of the slide causes the cam groove in the block 37 to act on the lever 40 and thus to swing the lever 27 from the position shown in Fig. 7 to the position shown in Fig. 4 in which latter position the sleeve 24 is clutched to the stationary clutch member 29 and the feed screw 10 is locked against rotation as above described. The carrying of the actuator into the dotted line position Fig. 4 operates the lever 23 to throw the clutch member 22 into clutching engagement with the pinion 17, thus coupling the nut 12 to the driving shaft and causing said nut to rotate. The table is thus moved by the direct action of the nut 12, and such movement of the table will continue until one of the dogs 33' again engages the trip device 32 and throws the same into the full line position Fig. 4. When this occurs the clutch is disengaged from the pinion and the parts are again brought to rest. To set the differential mechanism in operation again for feeding the table forward a second time the operator swings the handle 170 to the right into the full line position, Fig. 6, thereby disconnecting the sleeve 24 from the stationary clutch member 29 and coupling it to the sleeve 26, and at the same time throwing the actuator 30 and trip device 32 into the dotted line position Fig. 2, thereby again clutching the pinion 17 to the driving shaft 18. This throws the differential mechanism into operation and such operation will continue until during the movement of the table one of the dogs 33 strikes the trip device thereby to disengage the clutch 22.

The object in providing a yielding connection between the arm 40 and the arm 45 is to allow the full necessary movement of the slide 38 irrespective of whether the clutch teeth 28 are in engagement with the stationary clutch member 29 or not.

It will be noted that the trip device 32 comprises two arms arranged in different planes and that two sets of dogs are used, one pair 33 adapted to engage one of the arms of the trip device and the other pair 33' adapted to engage the other arm of the trip device. This construction is adopted in order that the dogs used for operating the trip device when in the position shown in Fig. 2 will not act upon the trip when it is in the position shown in Fig. 4, and similarly the dogs used in operating the trip when in the position shown in Fig. 4 will not actuate the trip when in the position shown in Fig. 2.

The shaft 18 may be driven by any suitable means. I have herein shown it as having a bevel pinion 50 thereon which meshes with a bevel gear 51 mounted on the upper end of a countershaft 52 which is journaled in a bracket or arm 53 secured to the carriage. The lower end of the countershaft 52 has thereon a bevel gear 54 which meshes with a bevel gear 55 that is splined to a power shaft 56 journaled in suitable bearings 57 carried by the knee, this construction permitting the carriage to move on the ways 5. The power shaft is driven by a cross shaft on which is secured a bevel gear 58 that meshes with a bevel gear on the power shaft 56. I have also provided for reversing the direction of rotation of the power shaft 56. This may conveniently be done by loosely mounting on said shaft two bevel gears, 59, 60, which are constantly in mesh with the bevel gear 58, and fixing to said shaft a clutch member 61 which is adapted to be brought into engagement with either one of the gears 59 or 60. For throwing the clutch member 61 I have shown the power shaft 56 capable of movement in its bearings longitudinally sufficiently to bring the said clutch member into engagement with either bevel gear. For this purpose the end 62 of the power shaft is journaled in a blind aperture 63 formed in a bearing block 64, and the other end of said shaft is journaled in a sleeve 65 which is slidably mounted in the bearing 57. The sleeve 65 is non-rotary and is provided on its side with rack teeth 66 which mesh with gear teeth 67 carried by a rock shaft 68, the latter having the handle 69 thereon by which it may be turned. By turning the handle 69 the sleeve 65 and consequently the shaft 56 is moved longitudinally sufficiently to bring the clutch member 61 into engagement with either gear 59 or 60, and in this way the direction of rotation of the shaft 56 can be controlled.

For locking the handle 69 in either of its two extreme positions or in a central position, I have shown said handle as having the spring-pressed locking pin 70 which is adapted to set into any one of a plurality of apertures 71 formed in the bearing 57. When the handle is in the central position as shown in Fig. 8, the clutch 61 is disengaged from both gears 59 and 60.

I have also provided for operating the feed screw 10 by hand, and for this purpose have provided the carriage with a shaft 73, which shaft has thereon a pinion 74 meshing with the pinion 16. Said shaft 73 also has thereon a skew-gear 75 adapted to mesh with a coöperating gear 76 on the hand-operated shaft 77, said shaft having the hand wheel 78 thereon by which it may be turned. The shaft 77 is carried in a bearing 79 which is pivoted to the carriage at 80, so that by dropping said bearing slightly the gears 75 and 76 may be carried out of mesh, while by raising said bearing said gears may be thrown into mesh. The bearing is shown as having the slotted arm 81 through the slot in which extends the screw 82 mounted in the carriage. The bearing 80 is sustained in its lowered position by the screw 82 and it is held in its upper position by a locking pin 100 which is adapted to engage an aperture 101 in the carriage.

It is essential that the clutch 22 of the differential screw mechanism should be thrown out of engagement thereby to render said mechanism inoperative whenever the hand feed is thrown into operation, and accordingly I have provided an interlocking connection between the bearing 79 and the slide 38 whereby said bearing can not be elevated to bring the gears 75, 76, into mesh except when the slide 38 is in such position as to throw the clutch 22 out of engagement while maintaining the clutch 28 in engagement, as shown in Fig. 5. To accomplish this the bearing 79 is provided with the projection or pin 90, and the slide 38 is provided with an aperture 91 which registers with the pin 90 when said slide is in a central position, as shown in Fig. 5. The slide 38 extends through a bearing 93 secured to the carriage, and said bearing is also provided with an aperture 94 which is in line with the pin 90. With this construction it will be seen that the bearing 79 cannot be raised to bring the gears 75, 76 into mesh with each other unless the slide 38 is properly positioned, as shown in Fig. 5, with the pinion 20 clutched to the stationary clutch member 29 and the clutch 22 disengaged from the pinion 17. To explain this mechanism in a somewhat more analytical way, the control or trip-mechanism disclosed herein presents various features any one or all of which may be utilized. Thus, it involves a trip-element providing one contact surface adapted to co-act with one dog to move the trip-element in one direction, and also providing another contact surface adapted to co-act with another dog to move the trip-element in another direction. So also it establishes a dependency between two clutch-actuating arms whereby their action is mutually regulated. It further involves a safety device preventing the attendant from conflicting a hand-feed with the power-travel of the table. Again, it coordinates an automatic trip means with a hand-control. These and other improvements will appear more fully in connection with the following analysis of the illustrated embodiment of this invention: The trip-element is here instanced as a member 30 which is journaled in the table-support or saddle 6 adjacent the outer longitudinal edge of the table 8 so as to turn or swing about an axis extending transversely to the direction of travel of the table; said axis being in this instance arranged vertically. This member may be actuated either by hand or automatically by one or more dogs so as to be turned either clock-wise or anti-clock-wise, as the case may be, and it in turn may communicate its motion through a pin-and-slot connection, to means for determining whether the table shall be propelled or stopped, as the case may be. Thus, the trip-member 30 projects upwardly and its upper exposed end is configured to provide two contact-surfaces $a$ and $c$, each of which are off-set radially from the axis of the trip-member, and each of which occupies a different angular relation to said axis so as to be spaced apart in a circumferential direction, and each of which is in a different plane transversely to the axis of the trip-member. Conveniently, these contact-surfaces $a$ and $c$ may constitute end portions of arms 32 which radiate transversely to the axis of the trip-member; the one above the other so that each will present no obstruction to a dog intended to operate the other.

When the table is "feeding" (as distinguished from a quick-traverse) either to the left or to the right, the trip-member 30 will be in the position shown by Figs. 2 and 6, it will be turned a few degrees anti-clock-wise as soon as the contact-surface $a$ is impacted by either the upper-level dog A that operates at the end of the feed to the right, or by the complementary dog $A^1$ that operates at the end of the feed to the left. Thus, with the parts arranged as shown by Fig. 2, the table will be feeding (slow travel) to the right so that the dog A will gradually approach the trip-member and ultimately impact therewith. Dogs A and $A^1$ are shown L-shaped and are adjustably secured to the table by means of bolts passing through the upstanding portions of the dogs and having heads co-acting with a T-shaped slot provided by the front longitudinal edge of the table. The dogs A and $A^1$ also provide finger-like portions $e$ which project in a direction transverse to the axis of the trip-member within the plane of the contact-surface $a$ but clear of the plane of the contact-surface $c$.

Having shown how dogs A and $A^1$ may each actuate the trip-member 30, it will now be explained how these dogs are rendered ineffective for that purpose and how the dogs B and $B^1$ become effective. These last-mentioned dogs provide contact-surfaces $b$ and $d$, respectively, and these contact-surfaces are positioned in a path of travel adjacent the path of travel of the contact-surface $e$ of the other dogs; in this instance being below the same. These contact-surfaces $b$ and $d$ are provided by extensions projecting laterally from the dogs and below the plane of the arm terminating in the contact-surface $a$; but within the horizontal plane of the other arm 32 terminating in the contact-surface $c$. In the position shown by Fig. 2, dogs B and $B^1$ are ineffective to operate the trip-member because they ride past and below the arm 32 which terminates in the contact-surface $a$, but, when the trip-member has been turned about its axis sufficiently so as to assume the position shown for example by Fig. 4, then the lower arm 32 will bring the contact-surface $c$ into the path of travel of the dogs B and $B^1$ with the effect that the contact-surfaces $b$ and $d$ of these dogs will impact the contact-surface $c$ of the arm 32 and the trip-member will be actuated effectively. In this connection, it is noteworthy that the dog B, although secured to the table by means of the same slot that retains the dog A, nevertheless provides an extension to the right so formed and proportioned as to enable the contact-surface $b$ to be nested with the contact-surface $e$. It will thus be seen that this trip-member 30 may be actuated by either dog A or dog B. For example, in this embodiment, the first dog moves it anti-clockwise and the other dog moves it clockwise. Also, when this trip-member is in position to be actuated by the one dog, it is not in position to be actuated by the other, and conversely. This enables the contact-surface $b$ to pass by the trip-member before it is actuated by the contact-surface $e$ in the upper path of travel. The movements these impart to the trip-member may be utilized in determining the manner in which the table-propelling mechanism shall function. Thus, in the embodiment illustrated, the contact-surface $a$ lies in the path of travel of the dogs A and $A^1$ when the pin 31 at the lower end of the trip-member occupies a position in the slot of the lever 23 such that the clutch 22 engages the teeth 21 and thereby effects a positive connection between the shaft 18 and the gear-sleeve 17; thereby positively rotating the nut 16 so as to cause the screw 10 to be translated by the action of the said nut. It may here be stated that, by virtue of certainother parts to be subsequently described as characteristic of this specific embodiment, the screw simultaneously is rotated so as to create a differential effect and cause it to be translated at a comparatively slow rate such as corresponds with the feed of the table. In other words, when the contact-surface $a$ intercepts the path of travel of the dogs A and $A^1$, the table will be caused to feed to the right. Now, as soon as dog A advances until its contact-surface $e$ impacts with the contact-surface $a$, the trip-member 30 will be swung anti-clockwise with the effect of shifting the pin 31 to the left in its slot and thereby swinging the lever 23 clockwise and moving the clutch 22 to the right and out of driving engagement with the gear 17, so as to disconnect said gear from the shaft 18 through the clutch 22. It may be observed that, in this embodiment, the gear 17 is simultaneously disconnected from the sleeve 24, so that it remains stationary. In like manner, when the trip-member is swung to bring the contact-surface $c$ into the path of the dogs B and $B^1$, then the pin 31 will again be in such a position that the clutch 22 will engage the gear 17, with the effect that as soon as a dog impacts the trip-member it will be turned clockwise and turn the lever 23 also clockwise again to withdraw the clutch member 22. This instrumentality in this embodiment is shown in coöperative relation with a differential nut and screw mechanism for propelling the table and its general operation may also be described.

The gear-sleeve 24, which loosely circumscribes the shaft 18, has at each end clutch teeth so that when the gear-sleeve is in the position shown by Fig. 2, it is locked to the other gear-sleeve 26 and is rotated thereby. When in this position, and when the gear-sleeve 26 is also free from the shaft 18, both gear-sleeves 24 and 26 will remain stationary, since neither of them are connected operatively with the shaft 18. Therefore, the effect of an impact of either dog A or $A^1$ on the contact-surface $a$ will cause the feed of the table to stop as soon as the clutch-member 22 becomes disengaged. In order, however, that the table may now be caused to make a quick-traverse, it is only necessary to slide the gear-sleeve 24 into a position effective to lock the screw-rotator 15 against rotation and then to turn the nut 13 by means of the gear 17 on the sleeve 26 by throwing in the clutch 22. This simple operation is effected by means of the following instrumentality: A bell-crank lever 27 is shown riding in the peripheral groove provided by the gear-sleeve 24 so as to control its position and this bell-crank lever is in turn actuated by a means which establishes a dependency between it and the aforesaid lever 23. Thus, a shift-bar 38 is slidably mounted in the saddle or table-support so as to be capable of a longitudinal shift. This shift-bar 38 is also provided with a rack 46 which meshes with gear-teeth 47 provided by the trip-member, so that when the trip-member rotates anti-clockwise, the shift-bar 38 will move to the left, and vice versa. Now a Z-shaped cam 37 is secured to the shift-bar 38 so as to move as a unit therewith; and this Z-shaped cam provides a slot 30° in which rides the roller 39 at the extremity of lever 40 (see Fig. 6) which is pivoted about the same axis as the bell-crank lever 27. The purpose of interposing this lever 40 between the Z-shaped cam and the bell-crank lever 27 is to enable an impositive actuation to be had of the bell-crank lever 27, so as to prevent it from forcing the clutch-teeth 28 of the gear-sleeve 24 into mesh with the corresponding teeth at a clashing period. This is accomplished by providing the short arm 45 of the bell-crank lever 27 with two ears 44 spaced apart on opposite sides of the part 42 fixed to the lever 40 and by intervening a spring 43. The normal effect of this spring is resiliently to maintain the lever 40 in midway position between the ears 44, and to spring-press these parts into this relation whenever it is disturbed by reason of an interference of the clutch-teeth, so that, the instant the clutch-teeth come into registry, then will the spring 43 forthwith establish the meshing relation. It will be seen that this mechanism is very simple, yet quite effective to accomplish the object stated.

Assuming the parts to be in the position shown by Fig. 2 (table stopped at the end of the feeding stroke), it now becomes advisable to effect a return of the table at a quick-traverse rate to its starting position, and this is accomplished by moving the shift-bar 38 to the left (as by swinging the hand-lever 170 to the left) and this does two things; first, it brings the roller 39 in the Z-cam from the position shown by Fig. 2 into the position shown by Fig. 4 with the effect that the gear-sleeve 24 becomes locked by the stationary part 29, and the screw is thereby prevented from turning. During this shift to the left of the bar 38, the pin 31 also turns anti-clockwise in its slot, moving the lever 23 clockwise, until the pin passes its dead center and thereafter lever 23 is again turned anti-clockwise and causes the clutch member 22 to interlock with and positively rotate the gear-sleeve 26 by power derived from the shaft 18. The effect of this is to produce a quick-traverse of the table in a return direction until $a$ the dog impacts the contact-surface $c$ and disconnects the clutch 22; whereupon the table will stop. It is to be noted that, since in this embodiment, the clutch 22 is manually engaged with the teeth 21, it is not necessary to provide a yielding or lost-motion connection between the shift-bar 38 and the lever 23, whereas in the other instance, an automatic positive movement produced by dog-action rendered such an expedient necessary to avoid damage.

Although I have illustrated herein one embodiment only of my invention, I do not wish to be limited to the construction shown.

Having described my invention what I claim as new and desire to secure by Letters Patent is:—

1. An automatic trip-instrumentality combining a reciprocating table; mechanism for propelling said table comprising two clutch-members; a table-support; an element movably mounted on said table-support and connected on the one hand with one of said clutch-members and on the other hand with the other of said clutch-members; and means whereby said element may be automatically actuated by motion derived from said table to effect a shifting of one of said clutch-members.

2. An automatic table-control combining a reciprocating-table; two dogs adjustably secured at the longitudinal edge thereof, the one dog presenting a contact-surface movable in a higher line of travel, the other dog presenting a contact-surface movable in a lower line of travel; a table-support; a trip-member pivoted about a vertical axis in said table-support and presenting two contact-surfaces, each in offset relation to said axis, and the one adapted to be brought into the line of travel of the one dog, and the other adapted to be brought into the line of travel of the other dog, and table-feeding mechanism having its operation determined by said trip-member.

3. An automatic table-control combining a table; a screw-shaft journaled in said table; a nut for translating said screw-shaft: a power-driven shaft parallel with screw-shaft; a sleeve loose on said shaft; gearing between said sleeve and nut, a clutch-member splined to said shaft and adapted to slide thereon to clutch said sleeve and drive it from said shaft; clutch-mechanism adapted in one arrangement to rotate said screw-shaft by motion derived from said other shaft and adapted in another arrangement positively to lock said screw-shaft against rotation; an operating-lever for said clutch-member; and a trip member adapted when swung anti-clockwise about its vertical axis to cause said clutch-mechanism to be thrown into its screw-locking arrangement and also to cause said lever to effect an engagement between said sleeve and said clutch-member.

4. An automatic trip-instrumentality of the nature revealed combining a reciprocating table; a mechanism for propelling said table and comprising a shiftable clutch-member adapted in one position to cause said table to travel at a relatively slow or feeding rate and adapted in another position to cause said table to travel at a quick-traverse rate; a table-support; a trip-element movably mounted on said table-support; dogs mounted on said table and providing contact-surfaces movable in different paths of travel; said trip-element being constructed and arranged to be actuated by impact with one or the other of said contact points; and means enabling said trip-element to determine the position of said clutch-member.

5. A machine-tool including in combination a table-support; a trip-member mounted by said table-support and adapted to swing about a vertical axis, said trip-member providing two contact-points, each about equidistant from said axis and each in a different plane transversely to said axis, and spaced angularly apart from one another; a table adapted to translate on said support adjacent said trip-member; a first dog adjustably fixed to said table and providing an impact-surface traveling in a path adapted to be intersected by one of said contact-points when said trip-member has been swung into one position; a second dog also adjustably fixed to said table and providing an impact-surface traveling in a different path adapted to be intersected by said other contact-point when said trip-member has been swung into another position; and a table-propelling means controlled by said trip-member.

6. A machine-tool combining a table-support; a table slidable thereon; a differential-motion mechanism mounted in said table-support for propelling said table at a fast or at a slow rate, said mechanism comprising a gear having clutch teeth in its end and a coöperating splined clutch-member, a lever pivoted at an intermediate point to said table-support and having its one end adapted to shift said clutch-member and adapted to be actuated from its other end; a trip-member also pivoted in said table-support and providing an arm having a pin-and-slot connection with said other end of said lever: and dogs adjustably mounted on said table adapted to actuate said trip-member.

7. A table feed combining a table-support; a table; a dog adjustably secured at the longitudinal edge thereof; a trip-member journaled between its ends in said table-support to swing about a vertical axis, the upper end of said member providing contact-portions located in offset relation to said axis, a lever of the first order arranged transversely to the axis of said trip-member and pivoted to said table-support; a power-shaft journaled in said table-support; a sleeve loose on said power shaft and terminating in clutch-teeth; a clutch-member splined to said power-shaft, the one end of said lever being operatively connected to shift said clutch-member, and the other being actuated by the lower portion of said trip-member; a nut geared to said sleeve; and a screw-shaft journaled in said table and translated by said nut.

8. A table feed combining a pair of parallel shafts; a stationary-part concentric with one of said shafts and having clutch-teeth in its end-face; a rotatable-member also concentric with said shaft and spaced away from said stationary-part and also having clutch-teeth in its end-face; a shiftable rotary-member also concentric with said shaft and adapted in its alternate positions to be clutched with either said stationary-part or with said rotatable-member; gearing permanently connecting said other shaft with one of said members; a nut adapted to be rotated but restrained against translation, one of said shafts being threaded through said nut; and a table to which the ends of said threaded shaft are journaled and reciprocated thereby.

9. An automatic feed-control mechanism comprising a table; a feed-screw therefor; a nut receiving said screw; a first means for rotating or locking said screw against rotation; a first lever for operating said means; a second means adapted to be brought into a driving relation with said nut; a second lever for operating said second means; and means establishing a dependency between said levers such that when the movement of the nut-controlling lever is continued from a nut-rotating position into a nut-idle position, then the screw-controlling lever will automatically be urged into a position positively locking the screw against rotation.

10. A feed mechanism comprising a table; a splined-screw; a first gear concentric with said screw and adapted to rotate the same by means of a spline; a second gear also concentric with said screw and adapted to translate the same by means of a nut; a shaft arranged parallel with and at a fixed distance from said screw; a third gear concentric with said shaft and meshing with one of said other gears; means for shifting said third gear axially along said shaft relative to its meshing gear; means for locking said third gear against rotation; means for establishing a propelling-relation between said shaft and said shiftable gear, and a hand-operable lever-mechanism for shifting said third gear.

11. A trip-mechanism combining a supporting-frame; a rotatable shaft non-translatably journaled in said frame; a clutch-collar splined to said shaft; a trip-member mounted in said frame to swing about an axis transverse to the shaft and having its upper end provided with a radially extending actuating arm; a lever connected at one end to said collar and its other end having a pin-and-slot connection eccentrically with said member, said lever extending transversely both to said shaft and to the axis of said member and pivoted to the frame at a point intermediate its ends.

12. A feeding-mechanism combining a supporting-frame; a gear-sleeve non-translatably journaled therein and adapted to be rotated and having clutch and end-teeth; a shiftable clutch-member having a peripheral shifting-groove and clutch-teeth at each end; a part in fixed relation with said frame also providing clutch-teeth; said sleeve, member and part all being in coaxial relation; a splined feed-screw; a non-translating sleeve concentrically splined thereto; means permanently connecting said shiftable clutch-member in driving relation with said last-mentioned sleeve, whereby upon shifting said clutch-member, said feed-screw may be locked or rotated.

13. A feeding-mechanism combining a supporting-frame; a tubular-part fixed thereto and having clutch-teeth in its end; a sleeve rotatably journaled in said frame and providing a gear and having one end spaced away from said fixed part and also provided with clutch-teeth; an intervening tubular clutch-member shiftable in coaxial relation with said part and sleeve so as to be locked against rotation by said part and to be positively rotated by said sleeve; a splined feed-screw; and means permanently joining said shiftable clutch-member in propelling relation with said feed-screw, whereby said feed-screw may be positively rotated or absolutely locked according to the position of said clutch-member.

14. A machine-tool including in combination, a trip-member mounted to swing about a vertical axis and providing two contact-points, each about equi-distant from said axis and each in a different plane transversely to said axis, and also spaced angularly apart from one another; a first dog providing an impact-surface traveling in a path adapted to be intersected by one of said contact-points when trip-member has been swung into one position; a second dog also providing an impact-surface traveling in a different path adapted to be intersected by said other contact-point when said trip-member has been swung into another position; and a propelling-means controlled by said trip-member.

15. In a milling machine, the combination with a table, of a feed screw journaled therein, a nut coöperating with said feed screw but held against longitudinal movement, means to rotate both the nut and the screw but at different speeds to feed the table with a slow movement, a stationary clutch member, means operated by the movement of the table to disengage one of said parts from its rotating means and connect it directly to said stationary clutch member thereby to lock said part positively from rotation while permitting the other part to continue rotation whereby the table may be fed with a rapid movement.

16. In a feed mechanism for milling machines, the combination with a feed screw, of a nut having screw-threaded engagement therewith, nut-rotating means, screw-rotating means, manually-operated mechanism adapted in one position to clutch said means together whereby the screw and nut will rotate simultaneously, and in another position to lock positively one of said means from movement.

17. In a milling machine, the combination with a carriage and a table thereon, of a feed screw connected to the table, a nut rotatably mounted in the carriage and engaging the feed screw, a gear splined to the screw, a shiftable gear meshing therewith, means to rotate the nut and said shiftable gear in opposite directions and at different speeds, and means to shift the shiftable gear and means to lock it from rotary movement when in its shifted position while permitting the nut to continue its rotation in the same direction.

18. In a milling machine, the combination with a carriage and a table thereon, of a feed screw connected to the table, a nut rotatably mounted in the carriage and engaging the feed screw, a gear splined to the screw, a shiftable gear meshing therewith, means to rotate the nut and shiftable gear simultaneously, means to shift the shiftable gear, and means to lock it from movement when in its shifted position, while permitting the nut to continue its rotation.

19. In a feed mechanism for milling machines, the combination with a feed screw, of a nut having screw-threaded engagement therewith, a driving gear for rotating the nut, a second gear splined to the screw, a third gear for operating the second gear, said third gear being movable longitudinally, means operative in one position of said third gear to connect it to the driving gear, means operative in another position of said third gear to disconnect it from the driving gear, and means to lock the gear from rotation.

20. In a feed mechanism for milling machines, the combination with a feed screw, of a nut having a screw-threaded engagement therewith, a driving shaft, a driving gear thereon for operating the nut, a second gear splined to the screw, a third gear loose on the driving shaft and meshing with said second gear, a stationary clutch member, and means to move the third gear either into clutching engagement with the driving gear or into clutching engagement with the stationary clutch member.

21. In a milling machine, the combination with a table, of a feed screw journaled therein, a nut coöperating with the feed screw but held against longitudinal movement, means to rotate both the nut and the screw at different speeds for feeding the table with a slow movement, a clutch controlling the means for rotating the nut, automatic means to disengage said clutch, and manual means to lock the screw from rotating and also to throw the clutch into engagement again whereby the table is fed with a quick movement.

22. In a milling machine, the combination with a table, of a feed screw journaled therein, a nut coöperating with the feed screw, a gear for rotating the nut, another gear for rotating the screw, means to drive the screw-rotating gear from the nut rotating gear, a clutch controlling the operation of the nut-rotating gear, automatic means to disengage the clutch, and manual means to disconnect the screw-rotating gear from the nut-rotating gear and to lock said screw-rotating gear from movement.

23. In a milling machine, the combination with a carriage and a table thereon, of a feed screw connected with the table, a nut coöperating with said feed screw, a driving shaft having a gear thereon for rotating the nut, a second gear splined to the feed screw, a third gear loosely mounted on the driving shaft and meshing with the second gear, a fixed clutch member, manual means to throw said third gear into clutching engagement either with the driving gear or with the stationary clutch member, and automatic means to disengage the driving gear from the shaft.

24. In a feed mechanism for milling machines, the combination with a feed screw, of a nut having screw-threaded engagement therewith, nut-rotating means, screw-rotating means, manually-operated means adapted in one position to clutch the screw-rotating means to the nut-rotating means and in another position to lock positively the screw-rotating means from movement while permitting the nut-rotating means to continue its rotation.

25. In a milling machine, the combination with a table, of a feed screw journaled therein, a nut on the feed screw but held from longitudinal movement, power-operated means to rotate the nut and the screw at different speeds, a clutch for driving the power-operated means, manual means for rotating the nut, means to move the manual means into or out of operative connection with the nut, and means to lock the power-operated means to disconnect it from the nut when the manual means is operatively connected thereto.

26. In a milling machine, the combination with a table, of a feed screw journaled therein, a nut on the feed screw, a power-driven gear meshing with the nut, a clutch for driving said gear, a manually-driven gear also meshing with the nut, a manually-operated shaft, means to operatively connect said shaft to or disconnect it from the manually-driven gear, and means to lock said clutch disengaged when the manually-operated shaft is operatively connected to the manually-driven gear.

In testimony whereof, I have signed my name to this specification, in the presence of two subscribing witnesses.

JOHN EDGAR.

Witnesses:
  OTTO F. BARTHEL,
  WALTER A. GREENBURG.